April 9, 1940.　　　H. H. HOYER ET AL,　　　2,196,632
APPARATUS FOR AERATING LIQUIDS
Filed Oct. 20, 1938　　　3 Sheets-Sheet 1

Inventors
Henry H. Hoyer
Peggy Wilson
by
Sommers + Young
Attorneys

April 9, 1940.   H. H. HOYER ET AL,   2,196,632
APPARATUS FOR AERATING LIQUIDS
Filed Oct. 20, 1938    3 Sheets-Sheet 2

Inventors
Henry H. Hoyer
Peggy Wilson
by
Sommers & Young
Attorneys

April 9, 1940.                H. H. HOYER ET AL                 2,196,632
                       APPARATUS FOR AERATING LIQUIDS
                           Filed Oct. 20, 1938              3 Sheets-Sheet 3
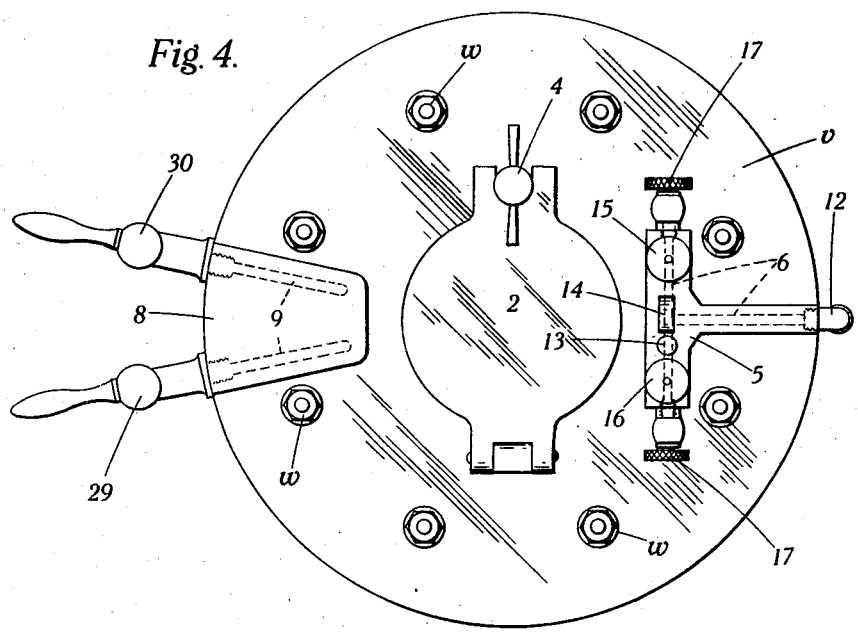
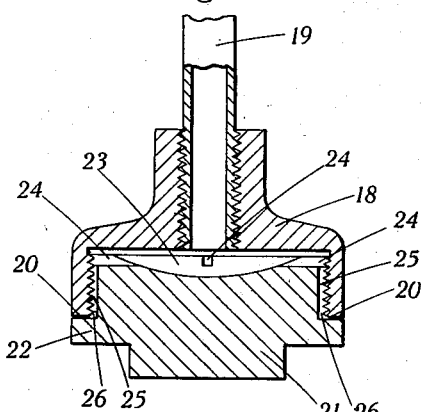
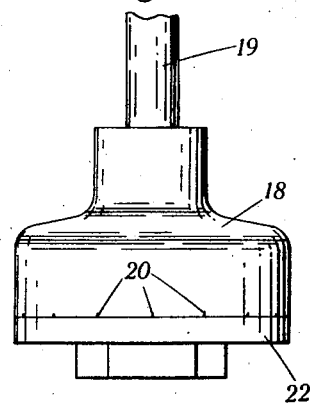
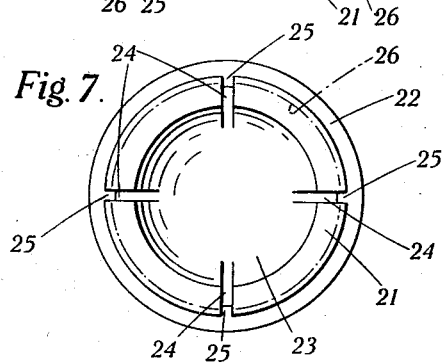
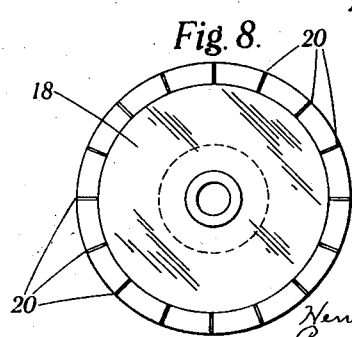
Inventors
Henry H. Hoyer
Peggy Wilson
by
Sommers & Young
Attorneys Patented Apr. 9, 1940

2,196,632

UNITED STATES PATENT OFFICE 2,196,632

APPARATUS FOR AERATING LIQUIDS

Henry Hamilton Hoyer and Peggy Wilson, Hamworthy, near Poole, England, assignors to Dorset Industries (Poole) Limited, Hamworthy, near Poole, England, a British joint-stock company Application October 20, 1938, Serial No. 236,126
In Great Britain September 24, 1937

6 Claims. (Cl. 225—18)

This invention comprises improvements in and connected with apparatus for aerating liquids and it has for its principal object to provide improved means for the production and dispensing in a simple and reliable manner of cool aerated soft drinks such as are sold nowadays in stores, shops, hotels, schools, restaurants and the like.

According to this invention, an apparatus for manufacturing aerated liquids comprises a vessel for liquid to be aerated, a chamber adapted to contain a charge of solid carbon dioxide and means for leading to liquid in such vessel gas emitted from the charge in the carbon dioxide chamber.

In carrying the invention into effect, a casing may be employed embodying a closed vessel for receiving liquid to be aerated and a chamber for receiving solid carbon dioxide, means being provided for leading gaseous carbon dioxide from the said chamber to the lower part of the vessel for aerating the liquid therein and further means being provided for dispensing the aerated liquid in syphon fashion from said vessel as required.

Apparatus of this nature may be quite self-contained and in shops and the like may be placed on a counter to serve as a soda fountain or carbonator. There need be no mechanical parts to operate beyond a draw-off tap or taps, for producing drinks for customers, and the carbon dioxide for the aeration can be used in the advantageous "dry ice" form now so largely manufactured for cooling and refrigerating purposes.

It will be realised that by utilising the carbon dioxide gas obtained from the solid product, a very simple method is provided for applying carbon dioxide for aerating liquids. The gas is also able to effect desirable cooling of the liquids and in rising through the body of liquid is able to cause considerable agitation resulting in highly effective aeration.

In order to enable the invention to be readily understood reference is directed to the accompanying drawings in which:

Figure 4 is a plan of the top of the apparatus seen in Figure 1.

Figure 5 is a sectional elevation, but to a larger scale, of the agitator device seen in Figure 1.

Figure 6 is an elevation of such agitator device.

Figure 7 is a plan of the plug part of said agitator device, and

Figure 8 is an inverted plan of the cup-like part of this agitator device.

Figure 1:
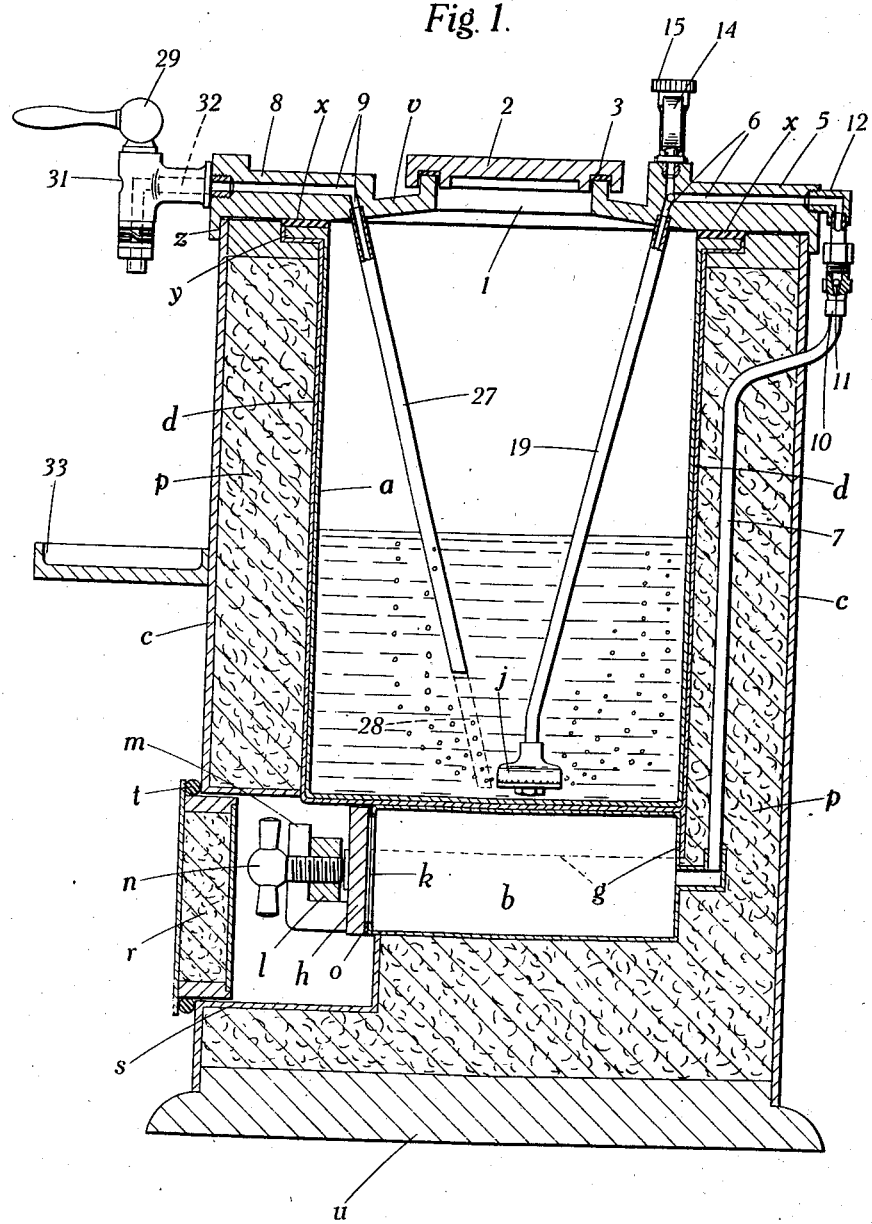
Figure 1 is a slightly irregular vertical section, with parts in elevation, of one example of apparatus in accordance with these improvements.
Figure 2:
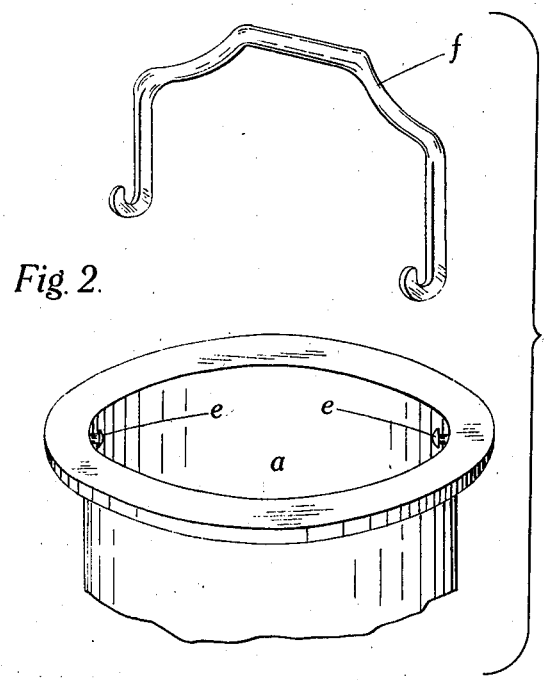
Figure 2 is a perspective view illustrating a construction of vessel for liquid, and of a bail-like tool, for facilitating removal of the vessel from its outer casing.

As shown in Figure 1, the apparatus comprises a vessel $a$ for receiving liquid to be aerated and a chamber $b$ beneath for receiving solid carbon dioxide, the two being disposed and insulated within a casing $c$. The vessel $a$ is suitably made in the form of a stainless steel cylinder or liner closed at the bottom and it is preferably inserted removably into a fixed metal casing $d$, so that it may be taken out for cleaning. For this purpose, and as shown by Figure 2, the liner $a$ may suitably have internal projections $e$ for engagement by a bail-shaped withdrawing tool such as $f$. As the liner $a$ is of stainless steel, which is able to withstand the pressures occurring, the liner casing $d$ may be of aluminium and made separately from the carbon dioxide chamber $b$ so that the latter may be a shallow bunker made of mild steel and thus advantageously capable of withstanding pressure. The liner casing $d$ suitably has a skirt $g$ at the lower end for attachment as by rivetting or welding to the bunker $b$ which is of cylindrical form except at the front where it is flat for application of the door $h$ to the carbon dioxide charging opening $k$. The bottoms of the liner $a$ and liner casing $d$ and the top of the carbon dioxide bunker $b$ are suitably disposed in contact with one another to facilitate conduction of cold from $b$ to $a$. For certain purposes, the liner $a$ may be dispensed with and then the part $d$ may serve as the vessel for liquid to be aerated being suitably made of stainless steel. Or alternatively use may be made of a steel cylinder closed at the bottom and having a horizontal partition providing a shallow carbon dioxide chamber in the lower part and a vessel for liquid in the upper part. This cylinder could be of stainless steel or if of mild steel, the upper part might be provided with a glass liner for the liquid. The door of the carbon dioxide chamber may be tightly closed by a bar $l$ engaging lugs such as $m$ on the chamber on either side of the door and fitted with one or more screws such as $n$. The door has suitable packing at $o$ so as to form a substantially hermetic closure for the bunker $b$. The outer casing $c$ may be of metal but is more conveniently made of wood, e. g., plywood, so as to avoid or reduce condensation of moisture on the sides of the apparatus. In order also to prevent deterioration of the heat insulating properties of the insulation $p$ of the casing, by condensation occurring on the exterior of the casing $d$ or the like, the insulation may be enclosed in a rubber impregnated and hermetically sealed envelope or envelopes. The casing $c$ is provided with an insulated door $r$ for the bunker opening $s$ and a packing $t$ may be disposed around the edge of this door. At the bottom, the apparatus may have an enlarged or ornamental base $u$ and the sides of the casing $c$ may be fitted with handles for lifting purposes.

Figure 3:
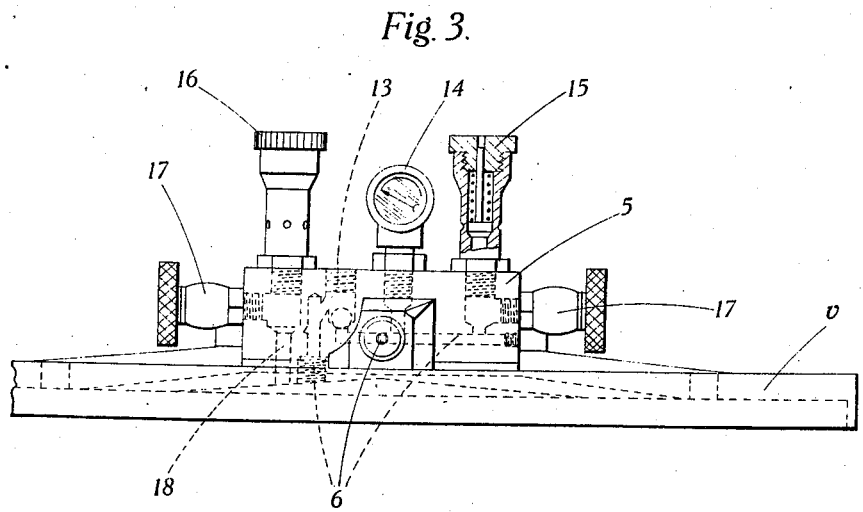
Figure 3 is a part sectional elevation of the top cover of the apparatus, and fittings thereof, as regarded from the right-hand side of Figure 1.

From Figures 1, 3 and 4 it will be seen that the vessel $a$ is closed by a top cover $v$. This is removably secured by screws and nuts at $w$ and when in position is pressed tightly by them against a packing $x$ at the mouth flange $y$ of the liner $a$. The top cover is suitably a casting e. g. of silver plated gun-metal, with a peripheral flange $z$ fitting over the top edge of the outer casing $c$ and a central filling aperture $l$ closed by a hinged cover 2 adapted to rest on a gasket 3 and to be held tightly down by a screw and nut fastening at 4. At diametrically opposite, or otherwise conveniently disposed, points the top casting $v$ has two thickened parts one, marked 5, being bored with passages 6 for inlet of carbon dioxide gas led by a pipe 7 from the carbon dioxide chamber or bunker $b$, and the other, marked 8, being bored with passages 9 for outlet of aerated liquid. The pipe 7 may ascend within the casing $c$ to near the top and there emerge at the rear for connection by a union 10 with a non-return valve fitting 11 mounted by an elbow 12 on the top casting. A second non-return valve may be provided at 13 in the passages 6 in the top cover. These non-return valves effectively prevent back-flush of liquid from the liner $a$ to the carbon dioxide chamber $b$ when the carbon dioxide in the latter is spent. The gas given off from the solid carbon dioxide is capable of creating a relatively high pressure inside the vessel $a$, say 90 lbs. per square inch, but as a much lower pressure is generally sufficient, safety valve means is provided to blow off at the desired working pressure. The pressure is suitably indicated by a gauge 14 mounted on the part 5 of the top cover in communication with the carbon dioxide inlet passages 6, and there may be a safety valve 15 open to these passages and a second safety valve 16 applied to a separate passage 18 communicating with the space above the liquid in the liner $a$. The second valve 16 would be set at the desired working pressure, which may vary with different liquids, and the first valve is an additional safety provision and set to release at a suitable higher pressure. The passages to each safety valve are 7 preferably fitted with a release valve or tap 17 for releasing the pressure, as when cleaning the apparatus.

The carbon dioxide is supplied to the liquid in the vessel $a$ through an agitator device which may take the form of a horizontal pipe ring with perforations for escape of the gas. However, in order to facilitate cleaning it is preferred to employ an agitator device $j$ of the construction shown in Figures 1 and 5 to 8. This device, which may be of silver-plated brass, comprises an inverted cup-like part 18 attached to the end of the descending carbon dioxide pipe 19 and provided in its lower peripheral edge with a series (say 24) of small radial slots 20. Into this cup-like part 18 a plug 21 is screwed which has a flange 22 to engage the lower peripheral edge of the part 18 and a hollow 23 at the inner end from which a number (say 4) of radial slots 24 lead to corresponding vertical slots 25 formed in the screwed part of the plug. As shown the screwed part of the plug may be of less depth than the corresponding portion of the cup part 18 to facilitate access of carbon dioxide to the slots 25 which terminate at their lower ends in a groove 26 in the plug which is open to the radial slots 20 of the cup part 18. As will be realised the parts of the agitator are readily separated and in this condition all the slots are exposed to allow of ready cleaning.

There may be one or more draw-off pipes for the cooled and aerated liquid. It is preferred to employ the arrangement, illustrated in Figure 1, which comprises pipes of different lengths namely a relatively short pipe 27 depending in the vessel $a$ to such a distance as would correspond to the level of the upper surface of say a gallon of liquid in the vessel (or more according to size), and a second pipe 28 shown dotted, depending almost to the bottom of the vessel. The pipes depend from the passaged part 8 of the top cover $v$ and the shorter one leads to a main draw-off tap 29 while the other leads to a secondary or reserve draw-off tap 30. Thus, when liquid ceases to discharge from the main draw-off tap 29, it will be realised by the operator that the apparatus needs re-charging with liquid and yet a further supply of liquid can be contained, if necessary, from the reserve draw-off tap 30. The arrangement also enables the apparatus to be re-charged while there is still a certain amount of liquid in the cylinder or liner $a$, with the advantage that this liquid serves to cool the freshly charged liquid without waiting. The agitator and draw-off pipes 19, 27 and 28 are suitably inclined towards the middle of the vessel $a$ as shown and being attached to the top cover $v$ are removable with the latter when cleaning is to be done.

The various passages in the top cover open into the periphery and upper and lower sides thereof and are suitably of straight formation so as to facilitate cleaning. Where the passages are required to be bent, for example the carbon-dioxide and liquid draw-off passages 6, 9, they are comprised by separate parts of straight formation disposed at an angle one to another so that cleaning is still readily possible. The draw-off taps 29, 30 are suitably of the variety having a hole 31 in their casings diametrically opposite to the inlet passage 32 and this allows insertion of a brush, for cleaning the adjoining passages 9 of the top cover $v$, by simply removing the valve plugs. The latter also have right-angled passages, as shown dotted in Figure 1, to facilitate cleaning. A plated drip tray may be fitted to the apparatus beneath the taps as at 33.

In operation, the vessel $a$ is charged with liquid to be cooled and aerated and carbon-dioxide in solid form is charged into the bunker $b$ and the door $h$ tightly closed. Carbon-dioxide gas, emitted from the solid product in bunker $b$ rises in the pipe 7 and is led to the agitator $j$ through the passages 6 and pipe 19. The gas is distributed by the agitator at the several points 20 to aerate and cool the liquid. It also sets up a pressure above the level of the liquid so that on operation of the draw-off tap 29 liquid is delivered in syphon fashion through the pipe 27, adjoining passages 9 and the tap. The cover may be fitted with a gauge for indicating the level of the liquid in the vessel a, but generally this is unnecessary with the arrangement of draw-off pipes 27, 28 described. When liquid is drawn off the carbon-dioxide gas vigorously agitates and aerates the liquid so that the latter is delivered in a uniformly aerated and cooled condition. As will be realised, all that is necessary to obtain aerated liquid from the charged apparatus is to operate the draw-off tap and there are no complicated mechanical parts requiring attention and operation for this purpose.

It will be understood that the apparatus shown is readily disassembled for cleaning and all parts may be easily cleansed, thereby advantageously complying with requirements of health authorities. Moreover, there is no likelihood of back flushing of liquid to the bunker b and the operation is capable of adjustment to suit whichever liquid is being served.

Under tests this apparatus has proved to be capable of efficient aeration and dispensing of a large range of liquids and of delivering them all in a favourably cool condition. During these tests, it has been found that, with an apparatus of 2½ gallons capacity, an unlimited quantity of liquid can be worked for a period of 10-12 hours with an expenditure of only 3 lbs. of solid carbon dioxide of which the cost is comparatively small (or slightly more carbon dioxide in the case of apparatus of larger capacity). In addition to soft drinks, the apparatus may be used for cooling and aerating lager beer for example, or for cooling and aerating milk. In the case of milk, aeration may be effected without addition of water such as would occur if soda-water were added to the milk. In the case of aerated liquids flavoured by squashes, the solids which occur in the squashes are kept moving and do not settle. Flavouring may also be effected by cordials and essences and an excellent aerated water is obtainable by placing ordinary water in the vessel a. A convenient working pressure for the aeration of beer is about 5 lbs., for milk about 10 lbs. and for aerated waters about 20 lbs. but the pressures may be readily varied if desired.

When the apparatus is closed it is entirely airtight and this, together with the use of carbon dioxide, acts effectively for preserving liquids, for example, milk will keep for several days in the apparatus and the tendency for fruit drinks to become sour is effectively prevented.

We claim:

1. Apparatus for the production and dispensing of aerated liquids, comprising in combination a heat-insulating casing, a vessel for liquid and a chamber for solid carbon dioxide both arranged in said casing with the insulation arranged closely about them, said chamber being external of said vessel but being adjoined therewith through parallel surfaces in heat-conductive relation with one another, a removable cover at the top of said casing, a carbon-dioxide-supply pipe depending from said cover into said vessel and having communication with said chamber, and a liquid-draw-off pipe depending from said cover into said vessel and having communication with the exterior of said casing.

2. Apparatus for the production and dispensing of aerated liquids, comprising in combination a heat-insulating casing, a vessel for liquid and a chamber for solid carbon dioxide both located in said casing with the insulation arranged closely about them, said chamber being external of said vessel but adjoined therewith through walls in surface contact with one another, a removable cover at the top of said casing, a carbon-dioxide-supply pipe depending from said cover into said vessel and having communication with said chamber, and a liquid-draw-off pipe depending from said cover into said vessel and having communication with the exterior of said casing.

3. Apparatus according to claim 1, comprising a plurality of liquid-draw-off pipes of different lengths depending from the cover and having communication independently with the exterior of said casing.

4. Apparatus according to claim 1, in which the cover has horizontal passages communicating with the pipes depending from said cover, these passages having straight formation for facilitating cleaning thereof.

5. Apparatus according to claim 1, in which the cover has a horizontal passage communicating with the liquid-draw-off pipe and the apparatus further comprises a draw-off tap mounted on the cover at the outer end of said passage, said tap having a hole in its casing opposite to the said passage to facilitate cleaning of the passage and the tap.

6. Apparatus according to claim 1 in which the cover has a passage communicating with the carbon-dioxide-supply pipe and with the chamber for solid carbon dioxide, and the apparatus further comprises two safety valves mounted on said cover, one of said valves having communication with the upper part of the space in the vessel for liquid, and the other of said valves having connection with said passage and being constructed to open at a higher pressure than the first-specified valve.

H. HAMILTON HOYER.
PEGGY WILSON.